March 9, 1954 R. B. EVERSON 2,671,756
SYSTEM FOR MIXING A GAS WITH A LIQUID
Filed May 24, 1949 3 Sheets-Sheet 1

INVENTOR.
Roy Blair Everson
BY
Moore, Olson & Trexler
Attys.

March 9, 1954 R. B. EVERSON 2,671,756
SYSTEM FOR MIXING A GAS WITH A LIQUID
Filed May 24, 1949 3 Sheets-Sheet 2

INVENTOR.
Roy Blair Everson
BY
Moore, Olson & Trexler
Attys.

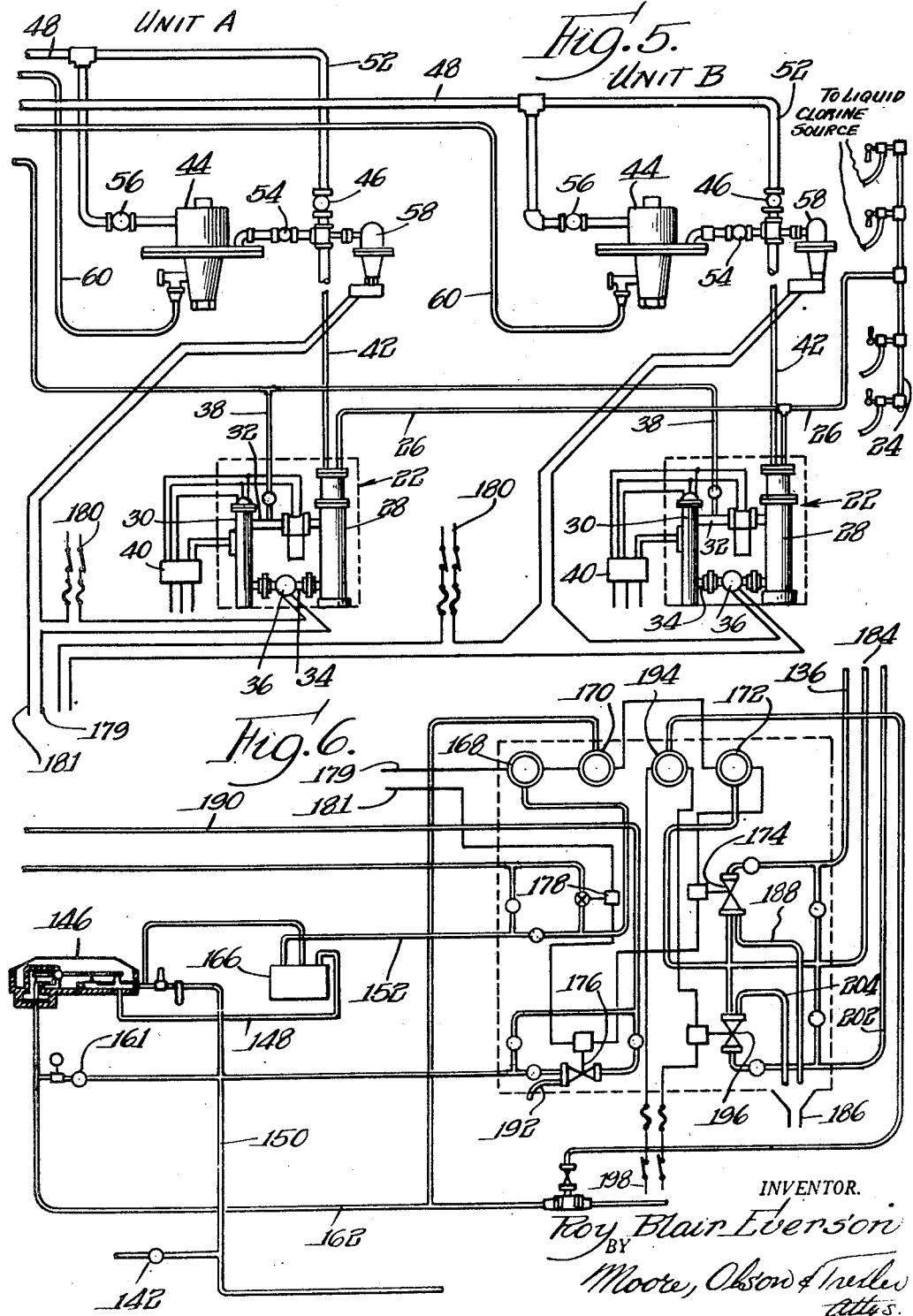

Patented Mar. 9, 1954

2,671,756

UNITED STATES PATENT OFFICE 2,671,756

SYSTEM FOR MIXING A GAS WITH A LIQUID

Roy Blair Everson, Chicago, Ill.

Application May 24, 1949, Serial No. 95,055

10 Claims. (Cl. 210—28)

This invention relates to an apparatus for absorbing a gas in a liquid and more particularly to a chlorinating apparatus.

It has been found that it is not practical to manufacture chlorinating units with a capacity larger than 6,000 pounds of chlorine per 24 hours. This size represents the maximum practicable size of the various functioning parts and in particular the chlorine gas supply valves. However many single installations of chlorinating apparatus require a total capacity far exceeding 6,000 pounds of chlorine per 24 hours.

It is therefore an object of the present invention to provide a chlorinating system which uses a plurality of standard size chlorinating units connected for cooperative operation and capable of large volume operation by automatically adding and removing the outputs of said chlorinating units to the point of application.

It is a further object of this invention to provide automatic equipment for receiving liquid chlorine from a source of supply and proportioning the chlorine into a stream of water flowing to a point of treatment and including automatic controls for interrupting the operation of the equipment in case of failure of the water supply or the chlorine supply.

Still another object of the invention is to provide apparatus for preparing a chlorine solution for the treatment of sewage flowing in a sewer, which apparatus is automatically cut off at predetermined minimum and maximum levels of flow of sewage in said sewer.

Yet another object of the present invention is to provide automatic equipment for proportioning chlorine into a stream of water, which equipment is provided with controls for cutting off the chlorine supply and water supply at a predetermined minimum water supply pressure.

Yet another object of the present invention is to provide a means for controlling the ratio of chlorine gas to water in the chlorine solution produced by a chlorinating apparatus.

Other objects will be apparent upon perusal of the following specification.

The foregoing objects are accomplished by the apparatus illustrated in the accompanying drawings which form a part of the specification and in which:

Figure 5 is an enlarged diagrammatic illustration of a portion of the apparatus shown in Figure 1 including liquid chlorine vaporizing equipment and part of the gaseous chlorine pressure regulating equipment; and Figure 6 is a view similar to Figure 5 showing a portion of the air controlled safety and operating apparatus.

Figure 1:
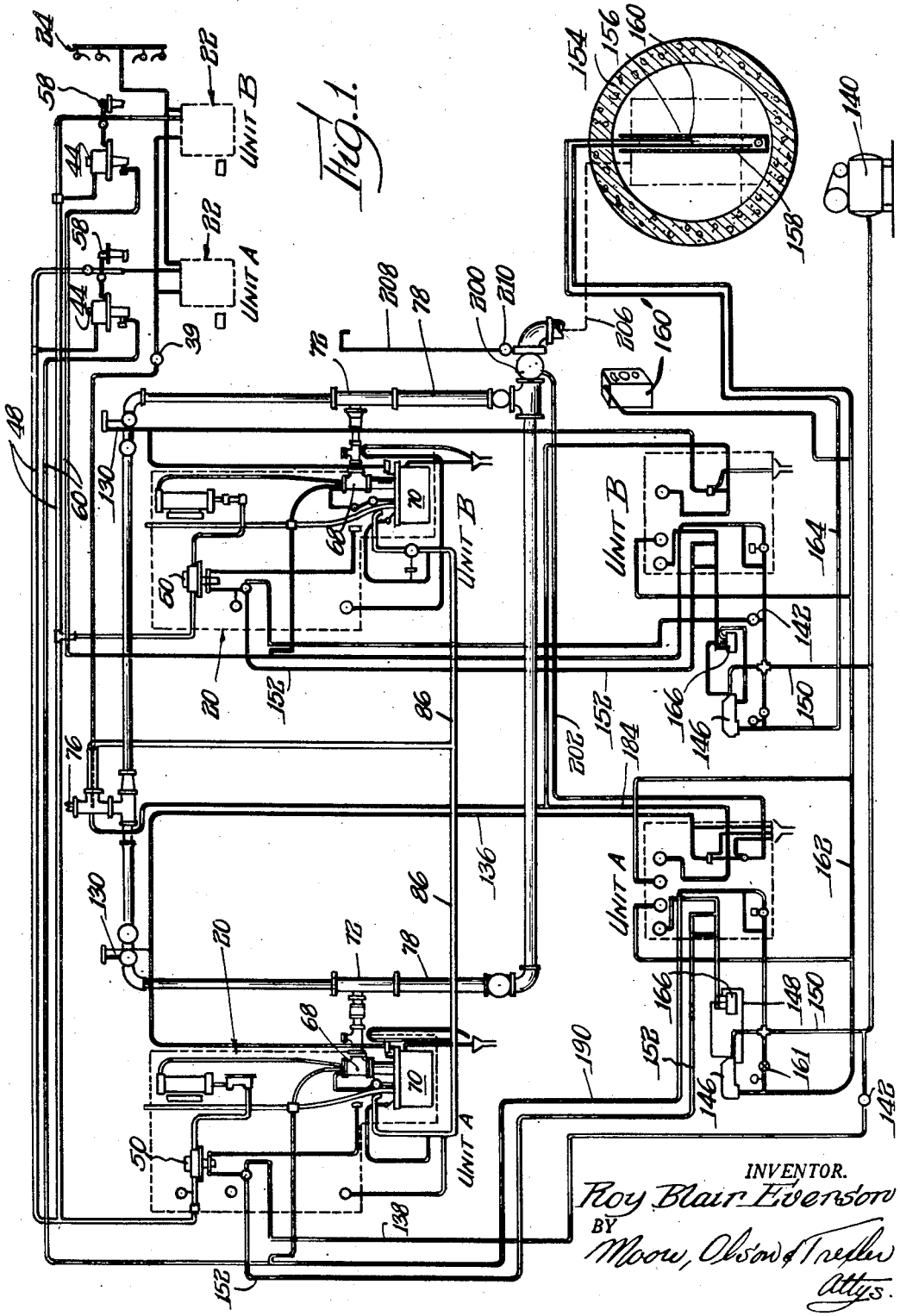
Figure 1 is a diagrammatic illustrative view of an embodiment of the present invention showing two standard sized chlorinating units connected for cooperative high capacity operation.

Referring now to Figure 1 it will be seen that the mixing unit A, generally designated by the numeral 20, is supplied by a gassifying unit 22. The details of this unit are shown in Figure 5. Liquid chlorine from a source (not shown), such as for example ton cylinders of liquid chlorine, enters a header 24 from which it is directed through line 26 to a water jacketed chlorine vaporizer 28. A supply of heated water is provided for the vaporizer 28 by an electrically operated water heater 30. Warm water enters the vaporizer 28 through line 32 and returns to the water heater through a line 34. The temperature of the water provided by heater 30 is thermostatically controlled.

It is undesirable to have liquid chlorine enter the absorbing system and accordingly a thermostatically controlled switch 36 is provided in return line 34. The manner in which switch 36 operates to cut off the chlorine supply when the temperature of the water in line 34 falls below a predetermined value will be explained hereinafter. To give a continuous water supply for the vaporizer heating system a water supply line 38 is provided which connects through a reducing and relief valve 39 to the main water supply. Electrical power for the heater 30 is supplied from a source 40. Of course, any other suitable heating means may be used.

Gaseous chlorine leaving the vaporizer 28 passes through line 42 to an air operated reducing and control valve 44. Valve 44 is open when conditions in the system are such that air pressure is supplied by the line 60. From valve 44 chlorine goes through line 48 to a chlorine regulator valve 50 (see Figure 2). Bypass valve 46 and bypass line 52 are provided to allow emergency operation in case of failure of the air supply or of valve 44. Cutoff valves 54 and 56 complete the bypass arrangement. A gas pressure switch 58 is attached to line 42 and is capable of cutting off operation of the entire chlorinating system in a manner which is to be described later, if the chlorine gas pressure is too low.

Figure 2:
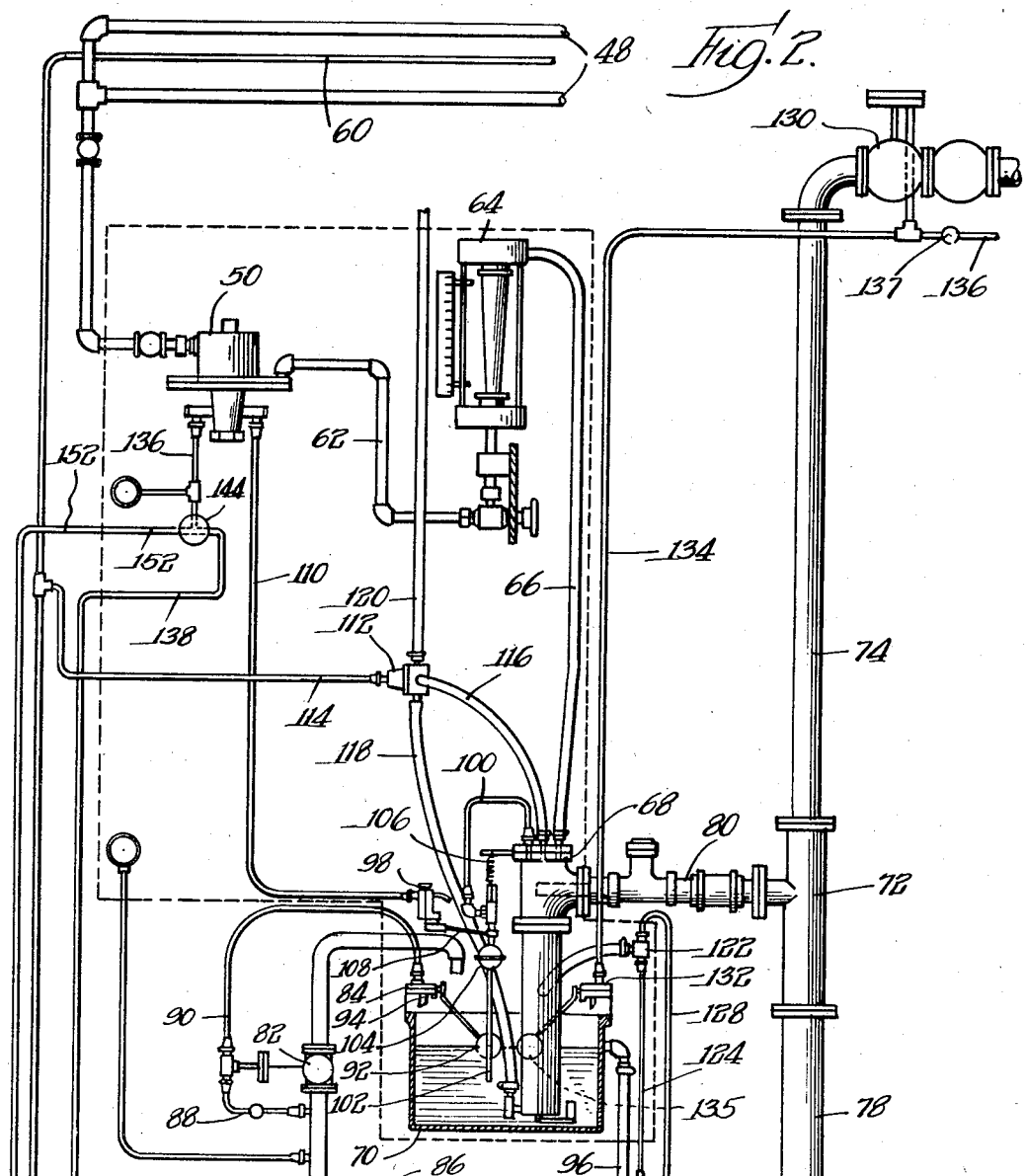
Figure 2 is an enlarged detailed view partly in vertical cross section of a portion of the embodiment shown in Figure 1.
Figure 3:
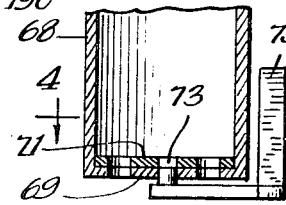
Figure 3 is an enlarged detailed view in vertical cross section of the lower part of the absorption tower.
Figure 4:
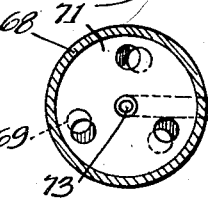
Figure 4 is a view in cross section on the line 4—4 in Figure 3.

As seen in Figure 2 chlorine gas leaves valve 50 through line 62 and enters a rotameter 64 from which it is taken in line 66 to an absorption tower 68. When chlorine is introduced to the gas absorption tower 68 it is dissolved in water drawn from supply tank 70 up through a closure member in the bottom of absorption tower 68 by an injector 72. As shown in Figure 2, the injector 72 is located in the water supply line 74 which receives water through line 76 (see Figure 1) which is connected to a source of supply not shown. From the injector, chlorine solution which is mixed with the operating water stream of the injector 72 flows through pipe 78 to a point of application.

The mixing of the chlorine and the water is accomplished when the chlorine gas passing through line 66 enters absorption tower 68 and meets the stream of water being drawn up through a closure member in the bottom of the tower 68 by the vacuum created by injector 72. The closure member consists of an apertured plate 69 fastened to the bottom of tower 68, and another apertured plate 71 which is rotatably mounted on plate 69 by means of shaft 73. Plate 71 may be rotated by means of a handle 75 whereby to control the flow of water through tower 68. The apertures in plates 69 and 71 are so situated that in certain positions of the handle 75 the apertures in the two plates cooperate to give a maximum opening. The apertures in the plates are so arranged that the area of flow in the bottom of tower 68 can be progressively diminished so that the rate of flow of water supply to tower 68 can be controlled. The chlorine solution thus formed flows through the laterally extending line 80 to the injector and thence to the point of application.

The water passing through tower 68 is supplied from tank 70. Valve 82 which is controlled by a pilot operator 84 controls the flow of water from line 86 to tank 70. Branch lines 88 and 90 supply water and water pressure to the control part of valve 82 and the pilot operator 84, respectively. Valve 82 is so constructed that when water pressure is supplied through line 88 valve 82 is closed. Release of this water pressure opens valve 82. Pilot operator 84, a valve operated by ball float 92, opens and closes a passage from line 90 to the outlet 94 of the pilot operator 84. When the ball float 92 is in the position shown in Figure 2, pilot operator 84 is closed and water pressure applied through line 88 to valve 82 stops any flow of water to the tank 70. When the water level drops to some predetermined point pilot operator 84 is opened, thus releasing pressure in lines 90 and the pressure applied to valve 82, opening valve 82 and allowing water to flow from line 86 to tank 70. When the ball float 92 is returned to the position shown, the pilot operator 94 is closed and the pressure in line 90 closes valve 82 stopping the flow of water into tank 70. By the foregoing means an adequate supply of water is maintained at all times in tank 70 unless the main supply of water fails, in which event the operation of the apparatus will be cut off as will be more fully explained later. An overflow 96 is provided for tank 70 to prevent flooding in case of failure of operation of the pilot operated valve 82.

To prevent chlorine from flowing to the absorption tower 68 when the water pressure to injector 72 fails a gravity operated valve 98 is provided. A conduit 100 communicates with the upper end of tower 68 and at the other end with a pipe 102 which is provided with an enlarged portion 104. The pipe 102 including the enlarged section 104 is suspended on a spring 106 which is supported at the top of tower 68. When there is sufficient water pressure for operation, injector 72 draws water through the bottom of tower 68 upward to the point of mixing. Likewise the vacuum in the upper portion of tower 68 is transmitted by means of conduit 100 to pipe 102. The presence of this vacuum allows water to rise through pipe 102 and into the enlarged portion 104. This added weight in pipe 102 expands spring 106 downwardly, thus actuating arm 108 of the gravity operated valve 98, maintaining the air pressure in line 110, thus opening valve 50 and allowing the flow of chlorine to the absorption tower 68. Upon failure of the vacuum in the tower 68 or of the water pressure in line 74, the water contained in the enlarged portion 104 will flow back into tank 70 and the spring 106 lifts the enlarged portion 104 and the associated parts upwardly, thus actuating arm 108 causing valve 98 to open releasing the air pressure from valve 50 causing it to close.

An air pressure operated vacuum breaker 112 is a safety feature provided to operate when operation of the absorption tower 68 is interrupted. Line 116 connects the vacuum breaker 112 to the top of tower 68. Line 118 on the vacuum breaker 112 is connected to the lower end of the tower 68 and line 120 is vented to the atmosphere.

When air pressure is supplied in line 114, lines 118 and 120 are connected to each other but line 116 is closed. If the air pressure in line 114 fails, line 116 is connected to line 120 by vacuum breaker 112. It is seen, therefore, that when the air pressure in line 114 is removed the chlorine which might still be in the tower will be vented directly to the atmosphere instead of permeating to the immediate surroundings. The release of the vacuum in this manner also prevents back siphoning of liquid into the control line.

As a further safety device an auxiliary injector 122 is employed. Water from line 86 which is connected directly to the main water supply (not shown) is supplied through line 124 to operate injector 122 and is carried to the drain 126 by pipe 128. As seen in Figure 2 the vacuum side of the injector 122 is connected to the tower 68 below its midpoint thereby maintaining a slight vacuum at all times in the tower, even if the main injector 72 fails for some reason.

Valve 130 is a diaphragm valve placed in the water supply line to the injector 72. The purpose of valve 130 is to economize in the consumption of water by reducing the amount of water supplied to the injector when the amount of chlorine being dissolved is reduced. This valve 130 is normally urged to the closed position by a spring. Also connected to valve 130 is a line 136 which supplies water pressure through valve 137. Valve 137 is so adjusted that a minimum operating water pressure is maintained to the injector. Valve 130 is controlled by a pilot control valve 132 whose operation is the same as the operation of the pilot control valve 84 described above. This pilot control valve 132 is connected to valve 130 through line 134 and is operated by a ball float 135.

The manner in which valve 130 and its associated parts operates to effect a decrease in water supply to injector 72 when the amount of chlorine being dissolved is reduced is as follows. When tower 68 and injector 72 are operating properly, a certain amount of water is flowing through line 74 and injector 72, thus tending to produce a vacuum in the upper portion of tower 68. This partial vacuum is transmitted back through chlorine line 66 and 62 to the chlorine control valve 50. This partial vacuum in the upper part of tower 68 accomplishes two things: one, it draws the chlorine from chlorine control valve 50 to the point of mixing; and, two, it draws water up through the bottom of tower 68 from tank 70. If the amount of chlorine supplied by chlorine control valve 50 is reduced, a smaller portion of the partial vacuum in the upper portion of tower 68 is used to draw the chlorine to the point of mixing and hence allows a greater amount of water to be drawn to the point of mixing through the bottom of tower 68. This momentary increase in the flow of water through tower 68 will lower the level of the water in tank 70, thus lowering ball floats 92 and 135. The lowering of the ball float 92 will increase the amount of water supplied to tank 70 and the lowering of ball float 135 will open control valve 132, thus reducing the water pressure in line 134 and the water pressure applied to valve 130. This reduction of the water pressure to the control section of valve 130 will allow the spring to move the diaphragm in such a manner as to reduce the flow of water through valve 130 to line 74. It will be seen that the floats 92 and 135 will reach an equilibrium point below their original position and thus ball float 135 will effect a decrease in the flow of water through line 74 to the injector 72. If the amount of chlorine supplied by chlorine supply valve 50 increases, the process will be reversed, thus increasing the flow of water to injector 72.

The proportion of chlorine to water in the chlorine solution leaving the absorption tower 68 is controlled by an air actuated control mechanism shown in Figure 6 which responds to changes in requirements for chlorine solution as occasioned by the change in the amount of sewage being treated. This air pressure control system also operates some safety devices which will be described hereinafter.

The proportion of chlorine to water in the chlorine solution is controlled by actuating valve 50. (See Figure 2.) Valve 50 responds to changes in air pressure in line 136; an increase in the air pressure in line 136 opens valve 50 and allows more chlorine to pass through the absorption tower 68. The pressure in line 136 may be controlled manually or automatically. In manual operation the pressure in line 136 is supplied through line 138 from the compressor 140 and is controlled by valve 142 as shown in Figure 1. The change from manual to automatic operation is accomplished by means of valve 144.

During automatic operation, valve 50 is controlled by a differential transmitter 146 in cooperation with a modulator 166 which receives air through line 150 from compressor 140 and supplies a pressure to line 152 which is proportional to the amount of sewage flowing through sewer 154. The amount of sewage flowing is measured in a still well 156 positioned in sewer 154. The sewage level indicating elements 158 and 160 are connected through reducing valve 161 to the compressor 140 by means of lines 162 and 164 respectively. Reducing valve 161 bleeds enough air pressure into lines 162 and 164 to operate indicating elements 158 and 160, but the amount of pressure needed to operate these indicating elements is so small in comparison to the operating pressure of compressor 140 that the pressure in line 150 is not materially effected by the changes of pressure in lines 162 and 164 which are brought about by variations in the levels of sewage in sewer 154. Indicating element 158 is also connected directly to the differential transmitter 146. The change in air pressure received by the differential transmitter 146 from the indicating element 158 is not in direct proportion to the increase in the amount of sewage flowing since the shape of the sewer is usually such that the increase in volume flowing is not directly reflected in the change in depth of sewage flowing in the sewer. For this reason modulator 166 is provided to modify the pressure transmitted by differential transmitter 146 in order to make the pressure transmitted in line 152 directly proportional to the amount of sewage flowing. The use of the differential transmitter 146 and the modulator 166 with the indicating element 158 provides an air pressure through line 152 to valve 50 which is directly proportional to the amount of sewage flowing in sewer 154.

Figures 5 and 6 show two of the electrical safety circuits. The first of these series circuits includes the thermostatically controlled switch 36 in the vaporizer heating water circuit, the gas switch 58, a low level air pressure switch 168, a high level air pressure switch 170, a low water pressure cut out switch 172, three-way water solenoid valve 174, a three-way air solenoid valve 176, a two-way air solenoid valve 178 and a source of potential 180. Lines 179 and 181 in Figure 5 are connected to the corresponding lines in Figure 6. To have continued proper automatic operation of the chlorinating system, the three solenoid valves 174, 176 and 178 must be energized. If these solenoid relays are to be energized all of the switches which are in series with these solenoids must be closed. To have these switches closed the chlorine vaporizer water supply must be at the proper temperature, the gaseous chlorine pressure in line 42 must be of the proper magnitude and the high and low air pressure switches and the lower pressure water switch 172 must be closed. It is seen therefore that if the air pressure in line 162 becomes too high, or if the output air pressure of the modulator 166 becomes too low, or if the pressure in the main water supply pipe becomes too low, various solenoid operated valves will become de-energized.

The solenoid valve 174 when in operating condition connects line 136 with the main water supply through line 184. When de-energized, valve 174 breaks the connection between lines 136 and 184 and connectes line 136 to drain 186 through pipe 188. De-energization of valve 174, therefore, will relieve the pressure applied through line 136 to cut-off valve 130, see Figure 2, closing this valve and shutting off the supply of water to injector 72. If any of the operating conditions are improper the injector water supply will immediately be cut-off and, as has been described before, this will also interrupt the chlorine gas supply to the mixing tower 68.

The three-way air solenoid valve 176 when energized connects line 150 with the vacuum breaker 112 and valve 44 through line 190. When de-energized, valve 176 opens line 190 to the atmosphere through line 192 and shuts the connection to line 150. The release of the pressure on vacuum breaker 112 will vent tower 68 to the atmosphere through pipe 120 as explained above and will also release the pressure on valve 44 causing it to close.

Solenoid valve 178 is placed in the line connecting the modulator 166 with the chlorine control valve 50. When valve 178 is energized the output of the modulator 166 is applied to the control valve 50. Thus the amount of chlorine being added to the water in tower 68 is varied in accordance with the amount of sewage being treated. When valve 178 is de-energized valve 50 is closed.

If any of the control variables such as the air pressure, chlorine pressure or water pressure are such that they would not give satisfactory operation of the mixing tower 68 it is evident that one or more of the various control switches named above would be opened thus interrupting operation of the tower 68 by shutting off the water to the injector 72 and closing the chlorine supply valve 50.

A second electrically controlled safety circuit is shown in Figure 6. This circuit includes a high level air pressure switch 194, a three-way water solenoid valve 196, and a source of potential 198. When energized, solenoid valve 196 connects the main water supply through line 184 to a water pressure operated valve 200 at the output point of the chlorinating system. See Figure 1. When a pressure is applied through line 202 to the valve 200, valve 200 is opened, thus allowing application of the chlorine solution to the sewer or other point of application. If switch 196 is de-energized, which occurs if the air pressure in line 162 becomes too high opening switch 194, the connection between lines 184 and 202 is broken and line 202 is connected to the drain 186 through pipe 204. This will relieve the pressure on valve 200 allowing this valve to close and interrupt the flow of chlorine solution to the point of application. The purpose of this circuit is to prevent back siphoning of sewage through line 206 when the flow of sewage in the sewer line 154 becomes too great. When valve 200 is closed, line 206 is vented to the atmosphere by line 208 through a check valve 210. If the transmitted air pressure in line 162 indicates that the sewage level is at some predetermined high point the switches 170 and 194 will be opened, thus opening both the above described electrically operated circuits. It is seen then that if the sewage level becomes too high, in addition to closing valve 200, the water supply and chlorine supply is interrupted by valve 130 and 50 respectively.

All of the above mentioned solenoid control valves are provided with by-pass means to allow operation of the chlorinator system under emergency conditions. It will be seen, however, that all of the safety devices are operative in the manual as well as the automatic operating condition.

In order to utilize modern production methods, it is usually most economical to manufacture standard sizes of chlorinating systems which will be in most demand by the consumers. However, at times situations are found in which the capacity of one of the standard chlorinating units is not sufficient. Rather than incur the expense of constructing special sizes of chlorinating units it would be desirable to use a system which could utilize standard size chlorinators. The present invention shows a method of applying the output of two or more standard chlorinator units to the same point of application and of automatically controlling the number of units operating at any time and the output of individual units at any time in accordance with the demand for chlorine solution.

To accomplish this, indicating element 160, see Figure 1, is connected to a differential transmitter modulating unit which in turn is connected to a standard chlorinating unit. Indicator unit 160 is positioned in the still well 156 in such manner that no signal will be applied to the second chlorinating unit until the flow of sewage has reached a predetermined level. When the flow of sewage reaches this predetermined level a signal is applied to the differential transmitter of the second chlorinating unit and starts operation of this second unit. The second chlorinating unit is of the same construction and has the same safety devices that the above described chlorinating unit has. Therefore, as the level of sewage rises the signal transmitted from indicating element 160 will be increased and will increase the amount of chlorine added to the chlorine solution by the second chlorinating unit B.

The pressure transmitted by indicating element 158 to the control valve 50 of the first chlorinating unit A will be of sufficient magnitude to fully open valve 50 shortly after the second chlorinating unit is put into operation. It is evident therefore that the first chlorinating unit A is put into operation as the level of sewage in sewer 54 rises and the amount of chlorine added to the chlorine solution in tower 68 will increase as the volume of sewage increases. At some predetermined level of sewage flow a pressure will be transmitted from indicating element 160 which will put chlorinating unit B into operation. Shortly thereafter the pressure transmitted by indicating element 158 to unit A will be sufficient to fully open valve 50. However the amount of chlorine added to the chlorine solution furnished by unit B will be increased as the level of sewage in the sewer 154 rises. At some predetermined point the level of sewage will be so high that the high level switches 170 and 194 will interrupt the operation of both chlorine units and will close valve 200 to prevent siphoning of sewage back into the chlorine system.

An added feature is an automatic air operated sewage flow recorder 160' which is attached to line 162.

It is to be understood that the foregoing detailed description of an embodiment of the present invention is intended to be illustrative only. To satisfy even greater capacity demands several chlorinating units could be connected in the manner which is disclosed in this invention. A wide variety of safety device and controls have been included and have been disclosed to insure against escape of dangerous chlorine gas and to give continuous effective operation which is sufficiently flexible to accord itself to a wide variety of conditions.

It is apparent that many widely different embodiments of this invention may be made without departing from the spirit and scope thereof and therefore it is not intended to be limited except as indicated in the appended claims.

I claim:

1. A system for treating liquid flowing through a conduit with a gas comprising mixing means for liquid and gas, connections to supply gas and a secondary flow of liquid to the mixing means to be mixed therein, a connection from the mixing means to the conduit to supply the mixture of gas and secondary liquid thereto to mix with the liquid flowing through the conduit, a control valve to control the supply of gas to the mixing means, a diaphragm in the control valve exposed on one side to pressure of the gas posterior to the valve and at its other side to a regulated air pressure to operate the valve, and a controlling mechanism responsive to the level of liquid in the conduit to produce a regulated air pressure proportional to the level and connected to the diaphragm to supply regulated air pressure thereto.

2. A system for treating liquid flowing through a conduit with a gas comprising mixing means for liquid and gas, connections to supply gas and a secondary flow of liquid to the mixing means to be mixed therein, a connection from the mixing means to the conduit to supply the mixture thereto to mix with the liquid flowing through the conduit, a control valve to control the supply of gas to the mixing means, a diaphragm in the control valve exposed on one side to pressure of the gas posterior to the valve and at its other side to a regulated air pressure to operate the valve, a controlling mechanism responsive to the flow of liquid through the conduit to produce a regulated air pressure proportional to the flow and connected to the diaphragm to supply regulated air pressure thereto, a vent pipe connected to the mixing means, a normally open valve in the vent, and pressure responsive means connected to said controlling mechanism to hold the last named valve closed in response to said regulated pressure.

3. In a system for absorbing a gas in a liquid, an absorption tower, conducting means to conduct gas to said tower, valve means for controlling the flow of gas through said conducting means, a pressure operated switch connected to said conducting means, a conduit to conduct liquid under pressure, an injector in said conduit connected to said tower to draw material therefrom, a valve in said conduit, a pressure responsive switch connected to said conduit, a duct through which liquid to be treated flows, said conduit discharging into the duct, control means responsive to flow of liquid in said duct for controlling said first named valve means, switch means responsive to and connected to said control means, electrical circuit means including said switches for opening and closing said electrical circuit means, and means controlled by said electrical circuit means and operating when said electrical circuit means is open to close said valve means controlling the flow of gas and said valve in said conduit.

4. A system for treating liquid flowing through a conduit with a gas comprising mixing means for liquid and gas, connections to supply gas and a secondary flow of liquid to the mixing means to be mixed therein, a connection from the mixing means to the conduit to supply the mixture of gas and secondary liquid thereto to mix with the liquid flowing through the conduit, a control valve to control the supply of gas to the mixing means, a shut off valve in the last named connection, and control means responsive to the flow of liquid through the conduit normally to control the control valve and including elements operative in response to a predetermined maximum flow to shut both the control valve and the shut off valve.

5. A system for treating a liquid flowing through a conduit with a gas, comprising a mixing chamber, means for introducing a gas from a source thereof into said chamber, means for introducing a liquid from a source thereof into said chamber, conducting means for conducting the mixture of gas and liquid to the conduit containing the liquid to be treated, control means having flow sensing elements positioned in the conduit, closure means positioned in a said conducting means, and venting means connected to the portion of the conducting means extending between said closure means and the conduit containing the liquid to be treated, said control means being effective simultaneously to close said closure means and open said venting means.

6. A system for treating a liquid flowing through a conduit with a gas, comprising a mixing chamber, means for introducing a gas from a source thereof into said chamber, valve means controlling the rate of flow of gas to said chamber, means for introducing liquid from a source thereof into said chamber, conducting means for conducting the mixture of gas and liquid to the conduit containing the liquid to be treated, control means having flow sensing elements positioned in the conduit, closure means positioned in said conducting means, and venting means connected to that portion of the conducting means positioned between said closure means and the conduit containing the liquid to be treated, said control means simultaneously closing said valve means and said closure means and opening said venting means at a predetermined maximum rate of flow of material to be treated.

7. A system for absorbing a gas in a liquid which comprises a container for liquid at atmospheric pressure, a conduit for conducting liquid under pressure including an injector, upwardly extending means for conducting liquid at atmospheric pressure from said container to the suction side of said injector, whereby the pressure in at least a portion of said upwardly extending liquid conducting means is below atmospheric pressure, means for conducting gas at a substantially constant pressure to a point in said last named liquid conducting means removed from said injector and at which the pressure is below atmospheric, means for controlling the flow of gas through said gas conducting means including a valve, a fluid pressure system connected to the valve to hold it open only when a fluid pressure is applied thereto, and means connected to and responsive to the pressure in said upwardly extending liquid conducting means for opening said fluid pressure system to the atmosphere whenever the pressure in said upwardly extending liquid conducting means rises above a predetermined absolute pressure.

8. A system for absorbing a gas in a liquid which comprises a container for liquid at atmospheric pressure, a conduit for conducting liquid under pressure including an injector, upwardly extending means for conducting liquid at atmospheric pressure from said container to the suction side of said injector, whereby the pressure in at least a portion of said upwardly extending liquid conducting means is below atmospheric pressure, means for conducting gas at a subtsantially constant pressure to a point in said upwardly extending liquid conducting means removed from said injector and at which the pressure is below atmospheric, means for controlling the flow of gas through said gas conducting means including a valve, a fluid pressure system connected to the valve to hold it open only when fluid pressure is applied thereto, a second conduit in parallel with the portion of said upwardly extending liquid conducting means etxending between said container and said point at which gas is introduced, said second conduit including a vertically shiftable portion in which liquid from said container at atmospheric pressure is normally maintained by the vacuum therein, said vertically shiftable portion being mounted to be moved to its lowermost position by the weight of the water normally present therein, means to move the second conduit upwardly when the quantity of water therein is less than normal, a vent to the atmosphere connected to said fluid pressure system, and a valve operated by said vertically shiftable portion and controlling communication between said fluid pressure system and said vent, said valve being closed when said vertically shiftable portion is in its lowermost position and open in other positions of said vertically shiftable portion.

9. A system for absorbing a gas in a liquid which comprises a container for liquid at atmospheric pressure, a conduit for conducting liquid under pressure including an injector, upwardly extending means for conducting liquid at atmospheric pressure from said container to the suction side of said injector whereby the pressure in at least a portion of said upwardly extending liquid conducting means is below atmospheric pressure, means for conducting gas at substantially constant pressure to a point in said upwardly extending liquid conducting means removed from said injector and at which the pressure is below atmospheric, means for controlling the flow of gas through said gas conducting means, including a valve, a fluid pressure system connected to the valve to hold it open only when a fluid pressure is applied thereto, a second normally open valve operated by said fluid pressure system and connected on one side to the atmosphere and on the other side to said upwardly extending liquid conducting means at substantially the point at which gas is introduced, said second valve being closed only when pressure is applied thereto from said fluid pressure system.

10. A system for absorbing a gas in a liquid which comprises a container for liquid at atmospheric pressure, a conduit for conducting liquid under pressure including an injector, upwardly extending means for conducting liquid at atmospheric pressure from said container to the suction side of said injector whereby the pressure in at least a portion of said upwardly extending liquid conducting means is below atmospheric pressure, means for conducting gas at a substantially constant pressure to a point in said upwardly extending liquid conducting means removed from said injector and at which the pressure is below atmospheric, means for controlling the flow of gas through said gas conducting means including a valve, a fluid pressure system connected to the valve to hold it open only when a fluid pressure is applied thereto, means associated with said upwardly extending liquid conducting means for opening said fluid pressure system to the atmosphere whenever the pressure in said upwardly extending liquid conducting means rises above a predetermined absolute pressure, a second normally open valve operated by said fluid pressure system and connected on one side to the atmosphere and on the other side to said upwardly extending liquid conducting means at substantially the point at which gas is introduced, said second valve being closed only when the fluid pressure is applied thereto from said fluid pressure system.

ROY BLAIR EVERSON.

References Cited in the file of this patent

UNITED STATES PATENTS

| Number | Name | Date |
| --- | --- | --- |
| 1,233,371 | Ornstein | July 17, 1917 |
| 1,233,394 | Ornstein | July 17, 1917 |
| 1,283,993 | Wallace et al. | Nov. 5, 1918 |
| 1,468,739 | Paterson | Sept. 25, 1923 |
| 1,609,756 | MacMahon | Dec. 7, 1926 |
| 1,613,438 | Brooks | Jan. 4, 1927 |
| 1,944,804 | Ornstein | Jan. 23, 1934 |
| 1,977,498 | Staegemann | Oct. 16, 1934 |
| 2,024,478 | Short | Dec. 17, 1935 |
| 2,024,479 | Short | Dec. 17, 1935 |
| 2,043,701 | Hartman | June 9, 1936 |
| 2,151,142 | Pardee | Mar. 21, 1939 |
| 2,260,936 | Everson | Oct. 28, 1941 |
| 2,315,512 | Everson | Apr. 6, 1943 |
| 2,336,994 | MacKay | Dec. 14, 1943 |
| 2,376,178 | Ornstein | May 15, 1945 |